June 20, 1950 A. WULLSCHLEGER 2,512,454
INFINITELY VARIABLE CHANGE-SPEED GEAR
Filed Sept. 2, 1947

Inventor:
August Wullschleger,
by Singer, Ehlert, Stern & Carlberg,
Attorneys.

Patented June 20, 1950

2,512,454

UNITED STATES PATENT OFFICE 2,512,454

INFINITELY VARIABLE CHANGE-SPEED GEAR

August Wullschleger, Olten, Switzerland

Application September 2, 1947, Serial No. 771,617
In Switzerland June 15, 1945

Section 1, Public Law 690, August 8, 1946
Patent expires June 15, 1965

5 Claims. (Cl. 74—689)

The invention relates to an infinitely variable, electrically driven change-speed mechanism, which may be used as a unit or as part of a machine tool.

The novelty lies in the feature that not only the armature but also the field or so called "stator" of the electric motor is rotatably supported and that at least two change-speed devices are provided which are in operative connection with each other, one of the devices being variable. The field and armature have different speeds and the resultant movement of rotation is transmitted by means of a planetary gearing unit to the machine doing work.

The new mechanism allows the available speeds to be infinitely varied within very wide limits, the means therefor being very simple and easy to operate.

Figure 2:
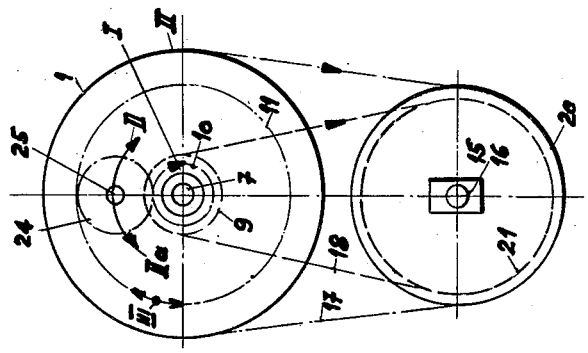
Figure 1:
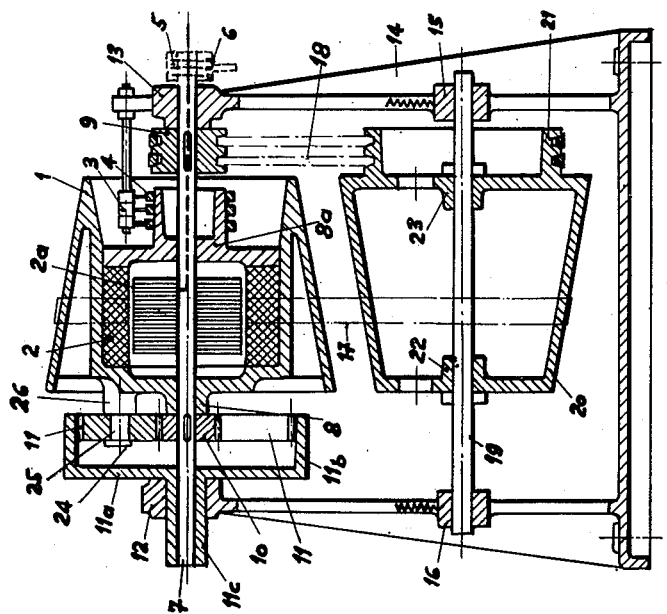

One embodiment of the subject matter of the invention is illustrated in the accompanying drawing, in which:

Fig. 1 is a longitudinal section, and
Fig. 2 an end view of the mechanism.

In the interior of the conical belt pulley 1 is the electric motor 2, 2a, the armature 2a of which is fixedly attached to the armature shaft 7. In the case of a motor type with squirrel-cage rotor, the current is introduced for instance through brush-holders 3 and slip rings 4 to the motor part 2, or from the brush-holder 6 through slip rings 5 and the shaft 7 to the motor part 2a.

The conical belt pulley 1 is, with the built in motor part 2, supported by the bearing shields and bearings 8, 8a so that it can rotate freely on the shaft 7. Motor part 2a, belt pulley 9 and toothed pinion or sun gear 10 are connected firmly to shaft 7. The orbit gear 11a is supported in the bearing 12 by means of the bushing 11c and serves at the same time as the bearing for the shaft 7. In addition, the shaft 7 is supported in the bearing 13. The planet gear 24 is rotatably supported on pin 25 and engages on the one hand with the sun gear 10 and on the other hand with the orbit gear 11a. The pin 25 is fixed in the boss 26 and is therefore rigidly connected to the motor part 2.

The bearings 12 and 13 are fixed on the frame 14. In order to keep the belts 17 and 18 tight, the bearings 15 and 16 are arranged movably on the frame 14. Within these bearings 15 and 16 the axle 19 is located, on which the conical pulley 20 is supported by the bearings 22 and 23. The belt pulley 21 is rigidly connected to the belt pulley 20.

The pulleys 1 and 20 along with the laterally displaceable belt 17 on them, form a cone gear. The belt pulley 9, along with the pulley 21, forms a belt gear with fixed speed-ratio, for instance with V-belts 18. Consequently, through the transmission members 7, 9, 18, 21, 20, 17 and 1 the motor part 2a is brought into a speed ratio with the motor part 2, which can be varied within a certain range by laterally displacing the belt 17. One condition for the speed variator with field and armature (2 and 2a) rotating in the same direction, i. e. with open belts 17 and 18, is that the variable speed-ratio between the field 2 and armature 2a cannot be 1:1, but may have any other desired value. With the parts 2 and 2a rotating in opposite directions to each other, i. e. with one of the belts 17 and 18 open and the other belt crossed, this limiting condition does not exist.

In the arrangement shown in the drawing, assuming the motor to be a 4-pole 3-phase motor having a normal speed of approximately 1500 R. P. M., the operation of the device is as follows: As the armature 2a rotates it drives the cone pulley 20 by means of the pulleys 9 and 27 and the belt 18. The pulley 20, in turn, by means of the belt 17 drives the cone pulley 1 and therewith the field element 2. The motor elements 2 and 2a thus drive the planetary gear unit in the usual manner. Assuming the belts 17 and 18 to be open, both motor elements 2 and 2a will rotate in a clockwise direction, as shown in Fig. 2. Since the difference in the speed of rotation of the motor elements 2 and 2a will always be about 1500 R. P. M., the speed ratio between the armature 2a and the field element 2 can never be 1:1. Assuming, however, one of the belts 17 or 18 to be crossed, the direction of rotation of the armature 2a and the field 2 are opposite and the speed ratio between them can be 1:1, since if each has a speed of 750 R. P. M. the resultant speed between the two elements is 1500 R. P. M.

An equation can now be established wherein the rotation of the armature 2a is designated as I and the field 2 has a rotation as designated by II or IIa, the orbit gear 11a will have a resultant rotational speed as indicated by III. If both belts 17 and 18 are open the equation is I−II→III, and I−II=1500 R. P. M. If one of the belts 17 or 18 is crossed the equation becomes I+II→III, and I+II=1500 R. P. M.

By a proper choice of the speed ratios of the belt and planet gears, this rotation III may remain always in the same direction between the upper and lower speed ratios, or it may assume different directions between these limits.

This variable rotation III of the orbit gear 11a may be transmitted to a working machine in a suitable manner either by means of belt, toothed on chain gear or by direct coupling to the machine. By a suitable utilisation of the attributes of the electric motor (for instance, phase angle, pole changing control, etc. in 3-phase motors), it is possible to alter the direction of the rotation movement III and to move the speed range with the existing change-speed ratios.

What I wish to secure by U. S. patent is:

1. In a variable change speed gear, the combination of an electric motor having relatively movable field and armature elements, said field element being constructed as a cone pulley, a second cone pulley, a transmission structure between said armature element and said second cone pulley, said transmission structure having a fixed ratio, a belt trained over said cone pulleys and axially shiftable thereon and adapted to impart infinitely variable speed to said first motor element, a driven part, and a transmission assembly interposed between said field element and said driven part.

2. In a variable change speed gear, the combination of an electric motor having relatively movable field and armature elements, said field element being constructed as a cone pulley, a second cone pulley, a third pulley of uniform diameter fixed to said armature element, a fourth pulley of uniform diameter fixed to said second cone pulley, a transmission belt trained over said third and fourth pulleys, another belt trained over said first and second cone pulleys and axially shiftable thereon, a driven part, and a transmission assembly interposed between said motor elements and said driven part.

3. In a variable change speed gear, the combination of an electric motor having relatively movable field and armature elements, said field element being constructed as a cone pulley, a second cone pulley, a transmission structure between said armature element and said second cone pulley, said transmission structure having a fixed ratio, a belt trained over said cone pulleys and axially shiftable thereon to impart infinitely variable speed to said field element, a driven part, and a transmission assembly in the form of a planetary gearing unit interposed between said motor elements and said driven part, a planetary gear of this transmission assembly being mounted on said field element cone pulley to revolve about the axis of the motor elements.

4. In a variable change speed gear, the combination of an electric motor having relatively movable field and armature elements, a frame structure, bearings fixedly mounted in said frame structure for supporting said armature element, said field element being constructed as a cone pulley, a second cone pulley, means for operating said second cone pulley at a predetermined ratio with respect to the rotation of said armature element, bearings in said frame structure movably mounted for supporting said second cone pulley, a belt trained over said cone pulleys and axially shiftable thereon to impart infinitely variable speed to said field element, a driven part, and a transmission assembly in the form of a planetary gearing unit interposed between said motor elements and said driven part and deriving impetus from both said motor elements to impart variable speed to said driven part.

5. In a variable change speed gear, the combination of an electric motor having relatively rotatable field and armature elements, a frame structure, an armature shaft on which said armature element is fixed, bearings fixedly mounted in said frame structure for rotatably supporting said armature shaft, said field element being constructed as a cone pulley and being rotatably mounted on said armature shaft, a second cone pulley, bearings in said frame structure movably mounted for supporting said second cone pulley, a third pulley of uniform diameter fixed to said armature shaft, a fourth pulley of uniform diameter fixed to said second cone pulley, a belt trained over said third and fourth pulleys to drive said second cone pulley at a speed of predetermined ratio to the speed of said armature element, a second belt trained over said first and second cone pulleys and axially shiftable thereon to impart infinitely variable speed to said field element, a driven part, and a transmission assembly in the form of a planetary gearing unit interposed between said motor elements and said driven part, the sun gear of said planetary gearing unit being secured to said armature shaft, the planet gear of said unit being rotatably attached to said field element at a distance from the axis of rotation of said field element, said driven part comprising the internally toothed orbit gear of said unit.

AUGUST WULLSCHLEGER.

REFERENCES CITED

The following references are of record in the file of this patent:

UNITED STATES PATENTS

| Number | Name | Date |
| --- | --- | --- |
| 844,748 | Riddell | Feb. 17, 1907 |
| 1,330,398 | Seidel | Feb. 10, 1920 |
| 1,746,029 | Chorlton | Feb. 4, 1930 |
| 2,164,818 | Heyer et al. | July 4, 1939 |